US011891243B2

(12) United States Patent
Dueñas Sanchez

(10) Patent No.: US 11,891,243 B2
(45) Date of Patent: Feb. 6, 2024

(54) WASTE-COMPACTING CONTAINER WITH DISINFECTION SYSTEM

(71) Applicant: Silverio Dueñas Sanchez, Granada (ES)

(72) Inventor: Silverio Dueñas Sanchez, Granada (ES)

(73) Assignee: Silverio Dueñas Sanchez, Granada (ES)

( * ) Notice: Subject to any disclaimer, the term of this patent is extended or adjusted under 35 U.S.C. 154(b) by 0 days.

(21) Appl. No.: 17/999,253

(22) PCT Filed: May 20, 2021

(86) PCT No.: PCT/ES2021/070365
§ 371 (c)(1),
(2) Date: Nov. 18, 2022

(87) PCT Pub. No.: WO2021/234206
PCT Pub. Date: Nov. 25, 2021

(65) Prior Publication Data
US 2023/0211944 A1 Jul. 6, 2023

(30) Foreign Application Priority Data
May 22, 2020 (ES) ................................ ES202030475

(51) Int. Cl.
*B30B 1/30* (2006.01)
*B65F 1/14* (2006.01)
(Continued)

(52) U.S. Cl.
CPC .............. *B65F 1/1405* (2013.01); *B30B 1/30* (2013.01); *B30B 9/3071* (2013.01);
(Continued)

(58) Field of Classification Search
CPC ....... B30B 1/30; B30B 9/3017; B30B 9/3071; B65F 1/1405; B65F 1/1415; B65F 7/00;
(Continued)

(56) References Cited

U.S. PATENT DOCUMENTS 2,476,574 A * 7/1949 Aluotto ................. B30B 9/3071 100/255
3,935,692 A * 2/1976 Miller ................... B65F 1/1468 53/527

(Continued)

FOREIGN PATENT DOCUMENTS

CN 2486509 Y 4/2002
CN 201264799 Y 7/2009

(Continued)

OTHER PUBLICATIONS

Written Opinion and Translated Written Opinion for International Application No. PCT/ES2021/070365 dated Aug. 18, 2021.

(Continued)

*Primary Examiner* — Jimmy T Nguyen
(74) *Attorney, Agent, or Firm* — Perilla Knox & Hildebrandt LLP; Kenneth A. Knox

(57) ABSTRACT

A residue-compacting container with disinfection system is described that includes a vertically displaceable structure, a lid and a bag, the structure comprising a chassis internally supporting a sealed container and has, vertically fixed on both sides, a lower lateral structure; two lower lateral structures, each formed by cylinders, a steel cable, a spring and a telescopic pipe; two upper lateral structures with a handle; and a sealed container formed by a lower cylindrical body and an upper cylindrical body; the container lid is located over the chassis and moves along the two upper lateral structures, has a hermetic sealing resin and contains mechanical elements for sterilizing and compacting the
(Continued)

residues contained inside a bag, which is located inside the sealed container.

8 Claims, 9 Drawing Sheets

(51) Int. Cl.
*B65F 7/00* (2006.01)
*B30B 9/30* (2006.01)

(52) U.S. Cl.
CPC .............. *B65F 1/1415* (2013.01); *B65F 7/00* (2013.01); *B65F 2210/162* (2013.01)

(58) Field of Classification Search
CPC .......... B65F 2210/162; B65F 2210/129; B65F 2210/168; B65F 1/065; B65F 1/1473; B65F 7/005
See application file for complete search history.

(56) References Cited

U.S. PATENT DOCUMENTS

| | | | | |
|---|---|---|---|---|
| 11,084,654 | B2 * | 8/2021 | Pestl | G05D 7/0617 |
| 2002/0056377 | A1 | 5/2002 | Gawley et al. | |
| 2020/0061948 | A1 * | 2/2020 | Childress | B30B 9/3046 |

FOREIGN PATENT DOCUMENTS

| | | | | | |
|---|---|---|---|---|---|
| CN | 108163422 | A | | 6/2018 | |
| CN | 108455126 | A | | 8/2018 | |
| DE | 20314460 | U1 | * | 2/2004 | B26F 1/24 |
| GB | 2580990 | A | * | 8/2020 | B65F 1/06 |

OTHER PUBLICATIONS

International Search Report and Written Opinion for PCT/ES2021/070365 dated Aug. 18, 2021.

* cited by examiner

WASTE-COMPACTING CONTAINER WITH DISINFECTION SYSTEM

CROSS-REFERENCE TO RELATED APPLICATIONS

This application is a national phase patent application under 35 U.S.C. § 371 of International Application No. PCT/ES2021/070365 filed May 20, 2021 entitled "WASTE-COMPACTING CONTAINER WITH DISINFECTION SYSTEM," which claims the benefit of and priority to Spanish Patent Application No. P202030475 filed May 22, 2020, the contents of both of which being incorporated by reference in their entireties herein.

TECHNICAL FIELD

The field of this disclosure is comprised in the residue containers manufacturing and commercialization sector, and specifically refers to a residues-compacting container with disinfection system.

BACKGROUND

Presently, when an individual has been infected by a high contagion level virus such as the COVID-19 virus, the residues generated by this individual while being ill are normally treated in conventional waste baskets, and more so if this individual endures the disease in his/her own home. This is since, until now, no domestic system capable of effectively disinfecting the generated residues is known, and hence the most widespread method is to dispose from these residues without any kind of previous treatment, which endangers all other dwellers in the premise, if the diseased person is treated in his own house. It also endangers the cleaning staff if the diseased is being treated in a hospital, as well as residues transportation professionals. It even endangers the environment since these residues have been disposed of with the rest of urban refuse in municipal dumps or recycling sites.

BRIEF SUMMARY

This disclosure is intended to enable users to compact and sterilize domestic or commercial residues; residues contained inside this disclosure can be then compressed and disinfected. Thus, the container of the present disclosure includes a main structure or framework comprised by a chassis, two upper lateral structures, two lower lateral structures and a sealed container lodged in the chassis skeleton; a lid located over the chassis moving along the upper lateral structures and contains mechanical elements for sterilizing and compacting the residues contained inside a bag, located inside the sealed container. In this manner, when the user disposes refuse remains in the bag located inside said sealed container, said remains are compressed and disinfected by the action exerted by the lid over the structure chassis.

DETAILED DESCRIPTION

Figure 1:
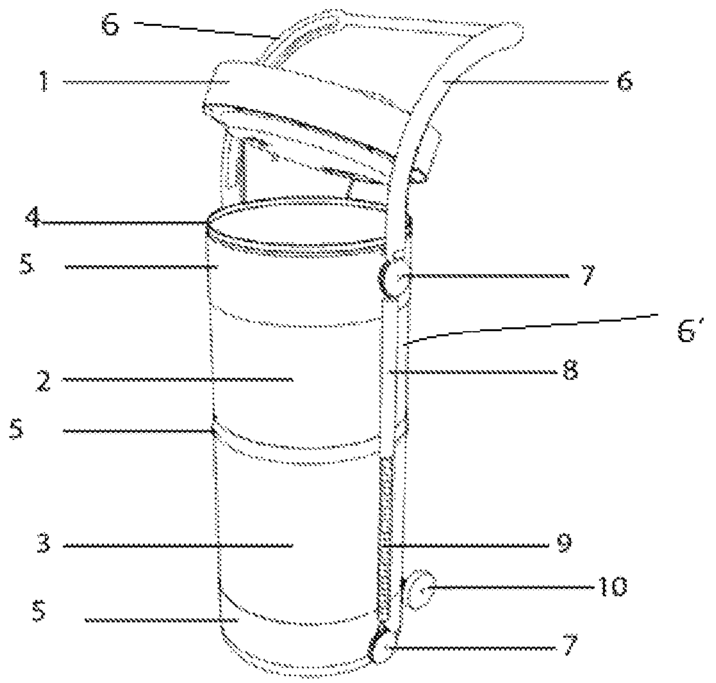
FIG. 1 shows a free perspective depiction of the residues-compacting container with disinfection system in a use position, with the lid opened.
Figure 2:
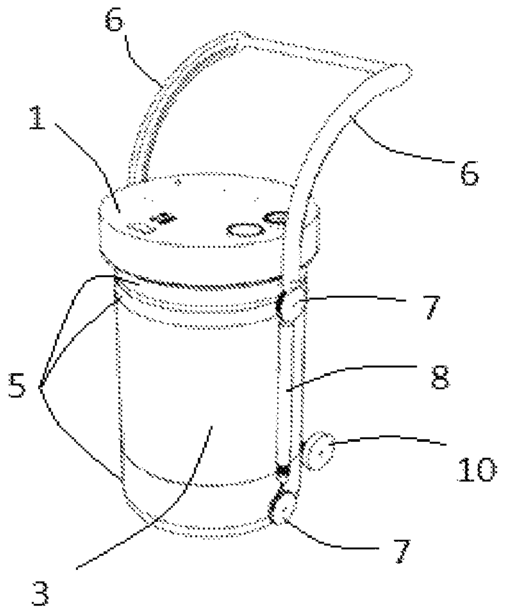
FIG. 2 shows a free perspective depiction of the compressed container, when the upper cylindrical body is displaced inside the lower cylindrical body.
Figure 3:
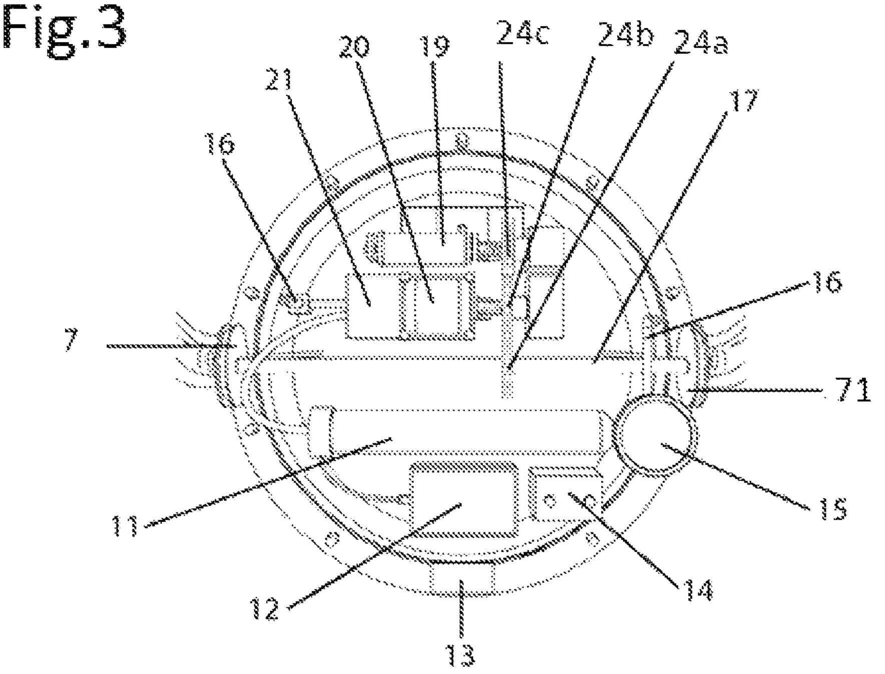
FIG. 3 shows a longitudinal section of the container lid, and the components lodged in its interior are schematically depicted.
Figure 4:
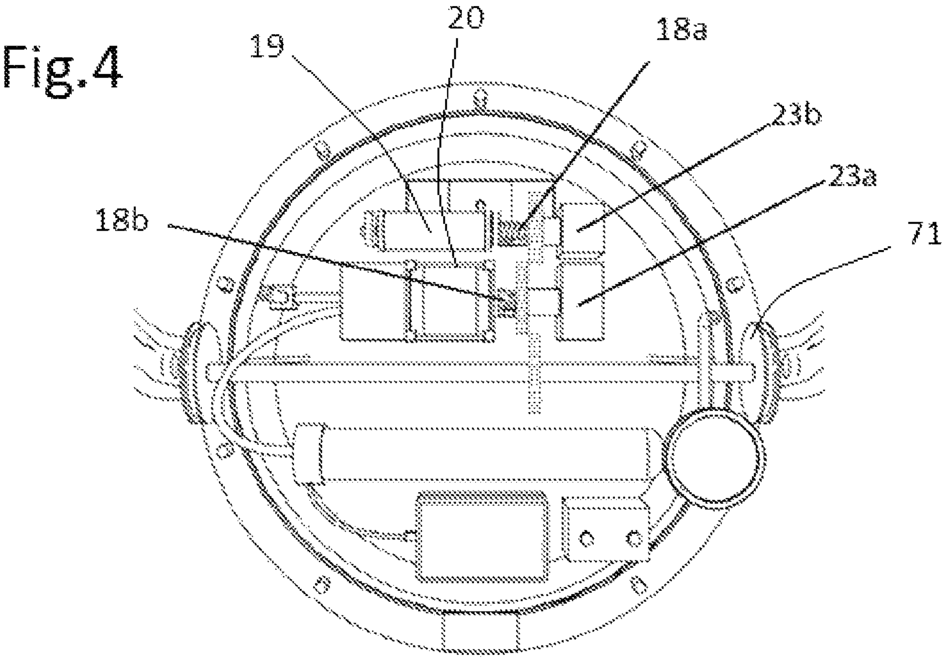
FIG. 4 shows the details of the lid longitudinal section in FIG. 3.
Figure 5:
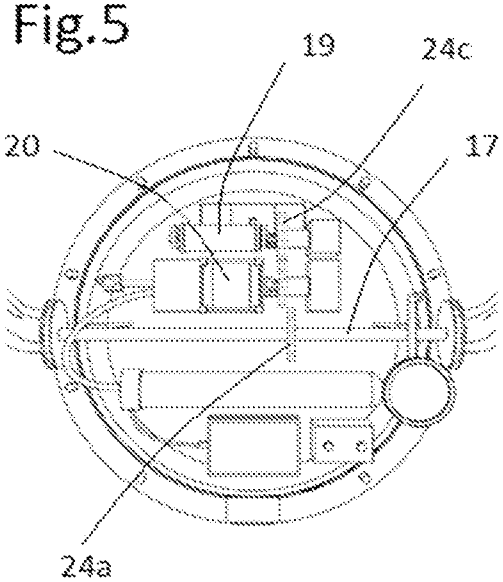
FIG. 5 shows the details of the setup of the dented wheels inside the container lid, when these dented wheels activate a string coil.
Figure 5A:
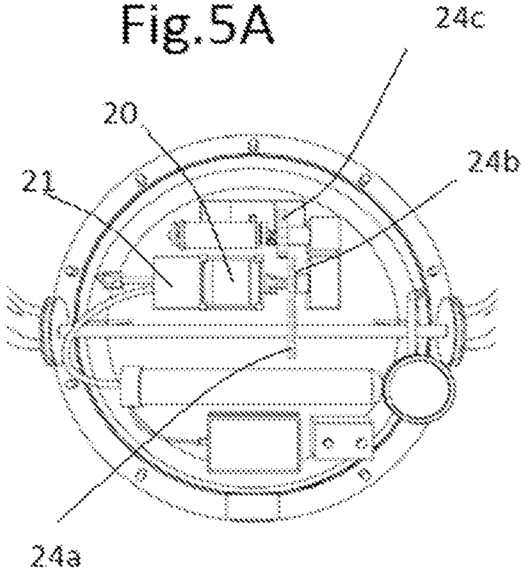
FIG. 5A shows the details of the setup of the dented wheels inside the container lid, when these dented wheels jointly move a pulleys axle and a gear motor axle.
Figure 6:
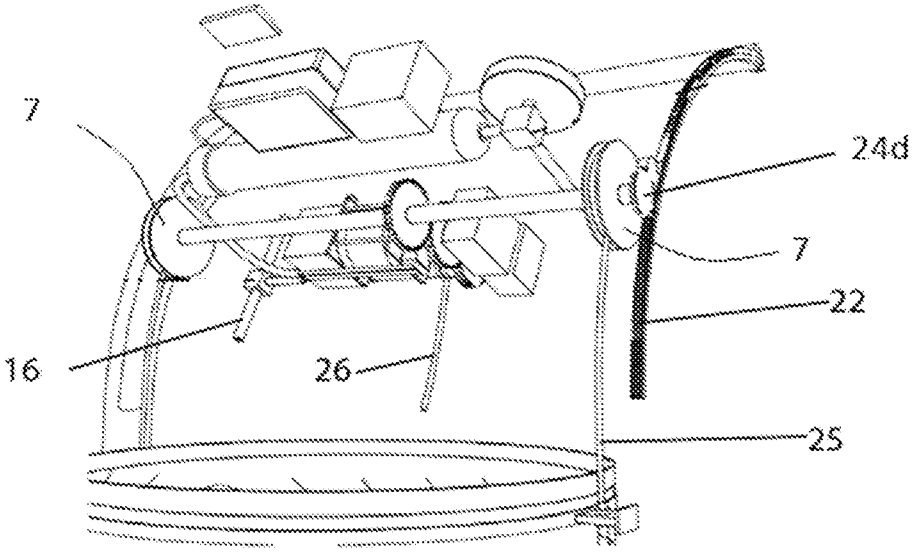
FIG. 6 shows a depiction of the container lid activation by the gear motor, in an embodiment of the invention.
Figure 7:
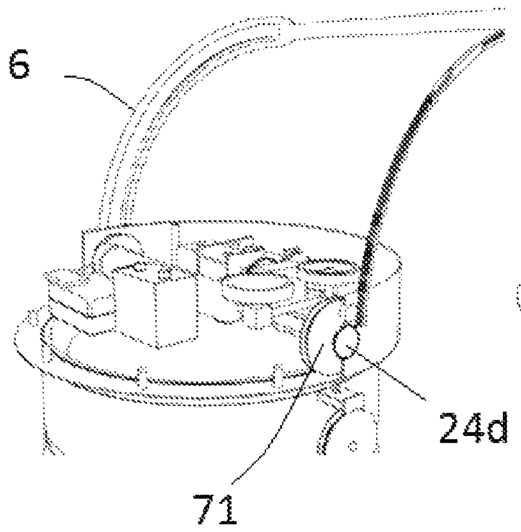
FIG. 7 shows a depiction of an embodiment of the internal components of the container lid, with the dented wheels not engaging the dented rails and the lid is closed.
Figure 7A:
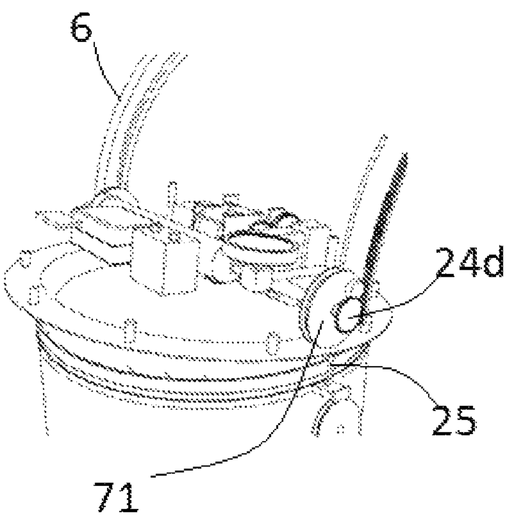
FIG. 7A shows a depiction of an embodiment of the internal components of the container lid, with the motor axle dented wheels and the motor dented wheels engaging the dented rails and the lid is opened.
Figure 8:
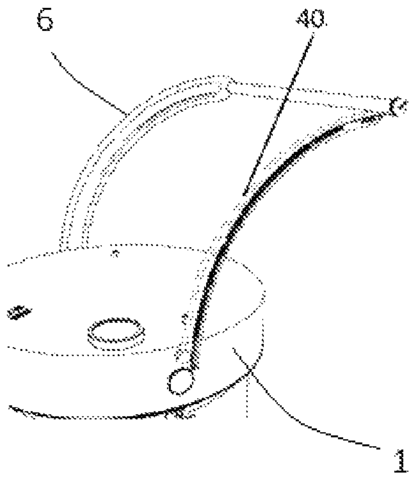
FIG. 8 depicts the functioning of the closure of the lid, with the coil spring located in one handle of the container structure, which exerts tension on the pulley axle dented wheel of the lid, and the lid is closed.
Figure 8A:
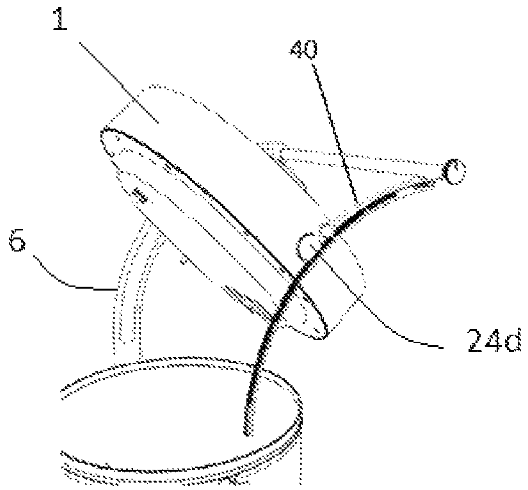
FIG. 8A depicts the functioning of the opening of the lid according to FIG. 8, with the coil spring not exerting tension on the pulley axle dented wheel of the lid, and the lid is opened.
Figure 9:
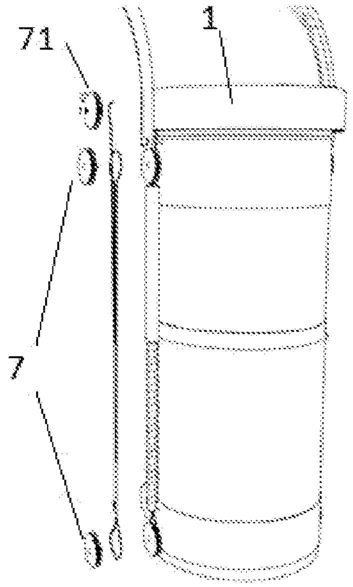
FIG. 9 depicts the mechanism of a set of cylinders in the lateral structure of the container, to compress the sealed container assembly.
Figure 9A:
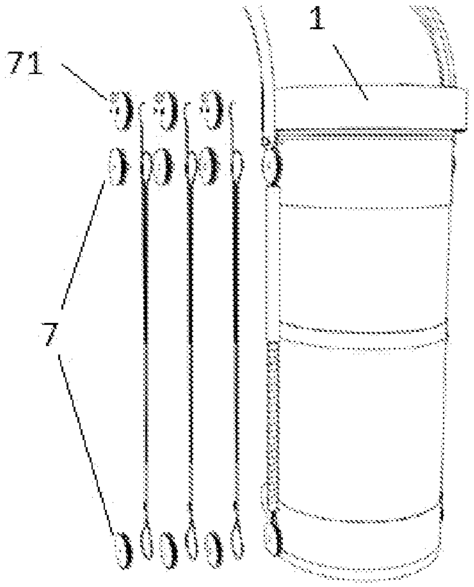
FIG. 9A depicts the mechanism of a set of cylinders according to FIG. 9, to compress the sealed container assembly.
Figure 10:
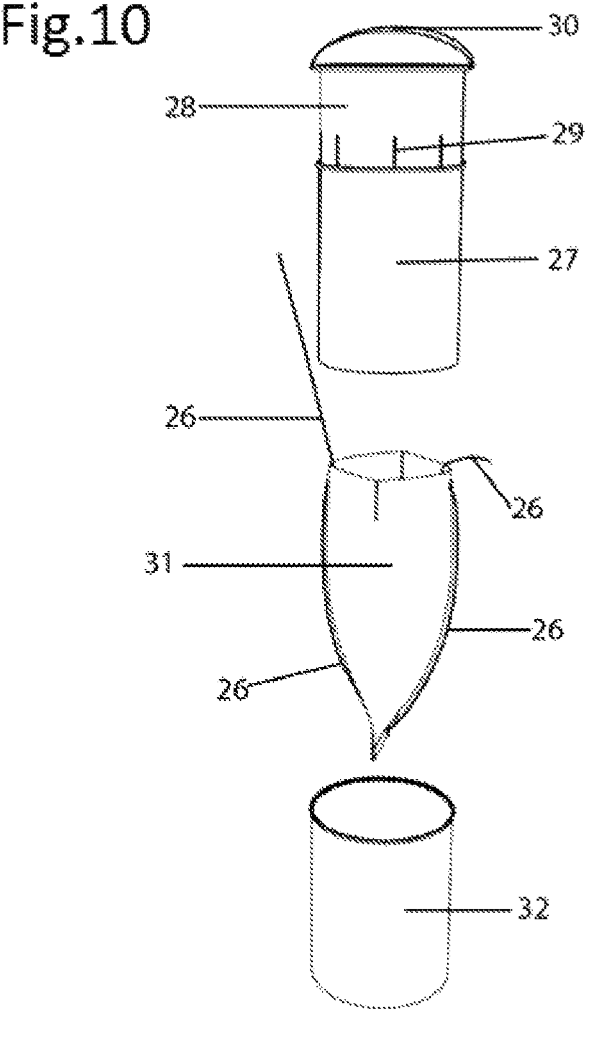
FIG. 10 depicts an exploded plane of one embodiment of the sealed container, constituted by a set of hollow and interchangeable cylinders sliding with each other, and where the residues to be sterilized and/or compressed are disposed.
Figure 11:
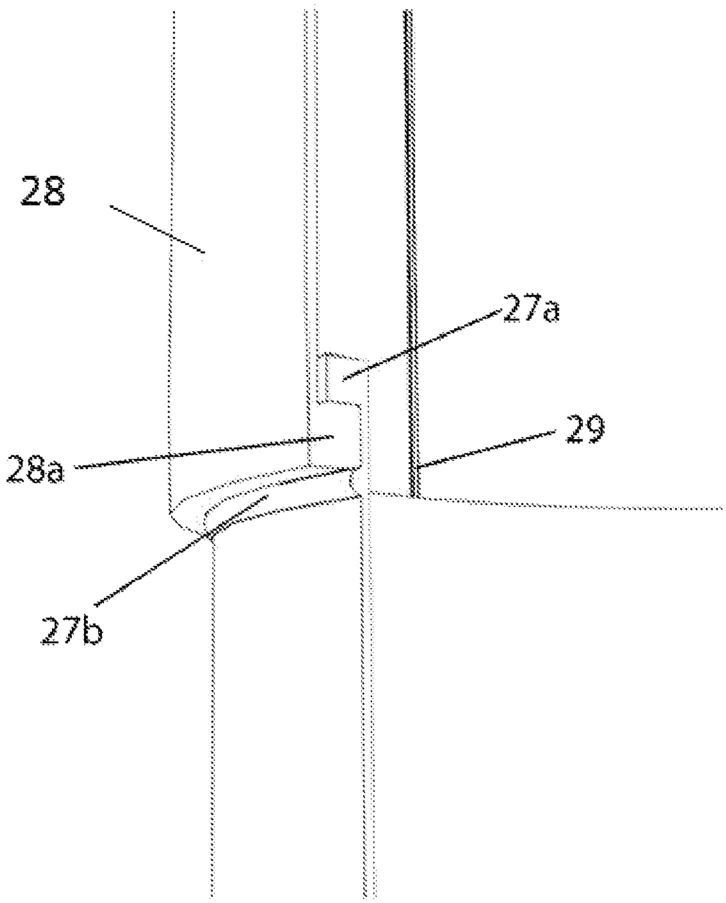
FIG. 11 depicts an exploded plane of one embodiment of the sealed container, constituted by a set of cylinders with tabs which prevent the cylinders to be spaced apart during the period when the residues to be sterilized and/or compressed are disposed.
Figure 12:
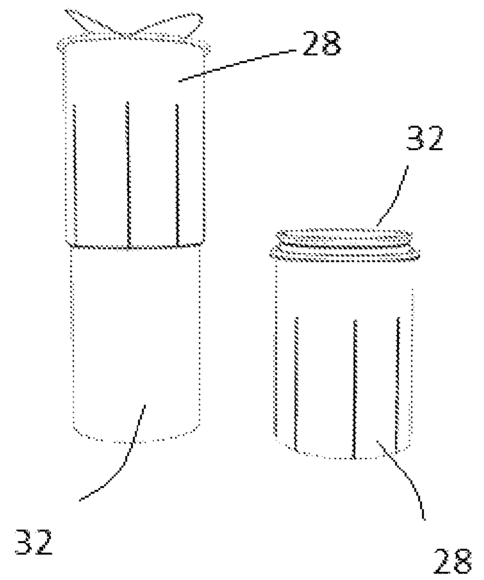
FIG. 12 depicts the sealed container according to FIG. 11, showing the positions of an upper hollow cylinder and a lower hollow cylinder, before and after the compacting.
Figure 12A:
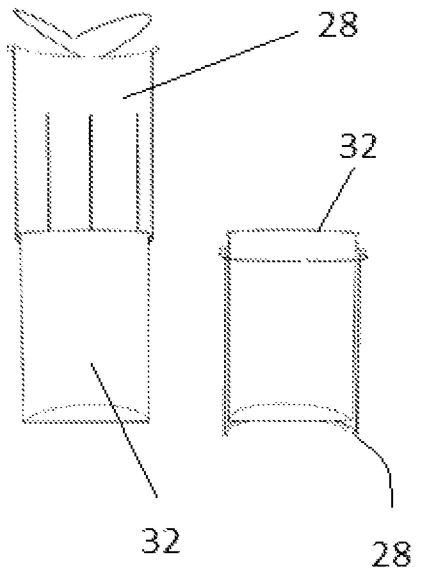
FIG. 12A depicts a cross section of the sealed container before and after the compacting showed in FIG. 12.
Figure 13:
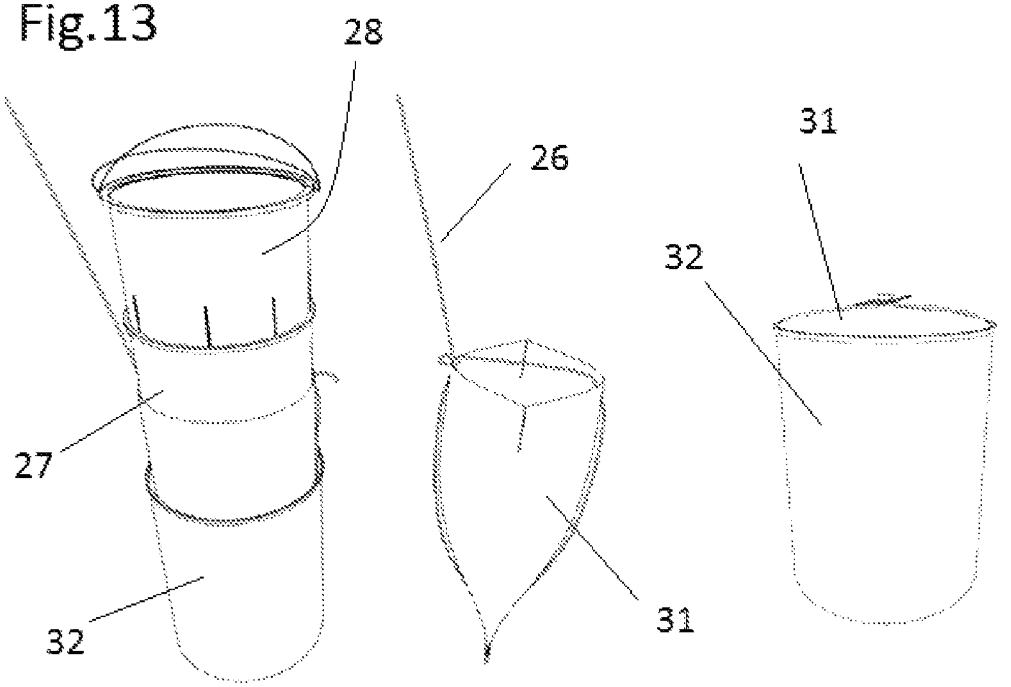
FIG. 13 depicts a schematic representation of all the elements comprising the sealed container, and a bag before and after the compacting shown in FIG. 10.
Figure 14:
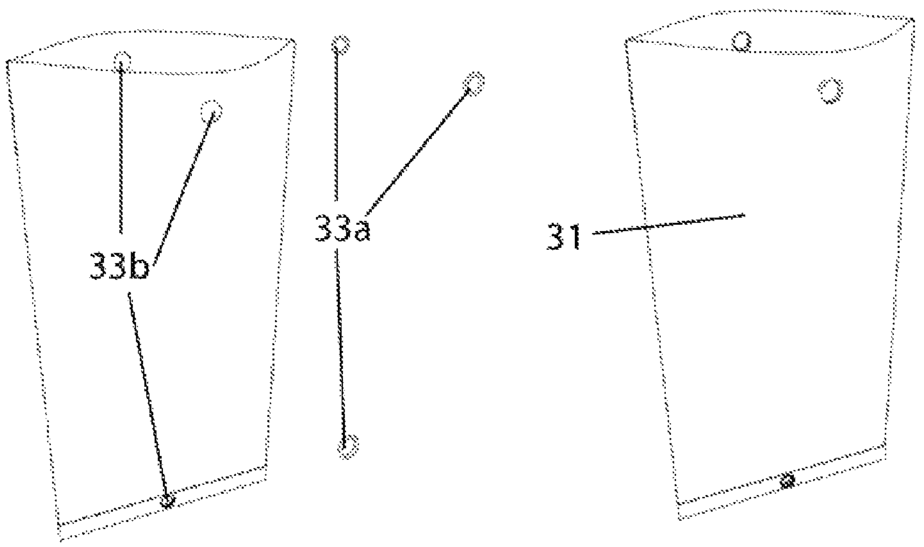
FIG. 14 depicts a representation of a compacting container bag where the residues to be compressed are packed, showing the placement of holes and washers acting as a guide for passing a string through them.

With the container of the present disclosure all residues generated during an infectious disease can be compacted and disinfected safely both for the diseased person and all other individuals having to be in contact with this person. Another feature to be highlighted is that this container also allows to discard all other residues generated in a house, commercial site, hospital and the like. These residues can also be compressed and disinfected, reducing their volume up to 90%, with the consequent savings in bags and space required to discard them. Accordingly, it can be asserted that the container of the present disclosure considerably reduces the carbon footprint of vehicles frequently transporting and/or recycling these packages, and above all ensures that packages are uncontaminated and recycled.

Thus, and according to the above description, the residues-compacting container with disinfection system of the present disclosure provides a different and improved solution to what is presently known in this field, and the present disclosure comprises a main structure comprised by a chassis, two upper lateral structures, two lower lateral structures and a sealed container lodged in the chassis skeleton; lid located over the chassis which moves along the upper lateral structures and contains mechanical elements for sterilizing and compacting the residues contained inside a bag, located inside the sealed container. Hence, the container of the present disclosure sterilizes and compacts all kinds of residues contained inside the container, in an improved and different manner to container known to date.

Thus, and according to the above description, the container of the present disclosure is a step forward in the residues containers manufacturing, since an improved type of structure, different to what is known to date, is obtained through a defined configuration.

Below the disclosure is described in its details, to further explain the ideas introduced up to this point.

The residues container with disinfection system of the present disclosure is constituted by a structure forming the container main structure, which in turn comprises a chassis, two upper lateral structures, two lower lateral structures and a sealed container, a lid, and a bag. The chassis internally supports the sealed container, and on its body the two lower lateral structures are vertically fixed by means of cylinders, and moreover the chassis has wheels incorporated to its base to be moveable.

Each of the previously described lower lateral structures are constituted by cylinders, and between them are located a spring, a telescopic pipe, and a steel cable inside and along these bodies. In their upper end, each lower lateral structure has fixed an upper lateral structure where the container lid is secured by means of displacement dented wheels. It is noted that the lid has mechanical elements for sterilizing and compacting the residues contained inside the bag, which is located inside the sealed container. This sealed container is lodged in the chassis skeleton and is comprised by a lower cylindrical body and an upper cylindrical body on top of it.

Thus, the residues-compacting container with disinfection system is reusable and has a hermetic closure, with a compression device which allows to increase or decrease its volume by means of two cylindrical pipes activated by pulleys, a steel cable and a geared motor.

Accordingly, the present disclosure is comprised by a chassis having two independent cylinders, a lower cylindrical body with a base and an upper cylindrical body with a lid, which are fixed to the sides of the lower lateral structure by means of telescopic pipes, which allow both cylinders to slide vertically without being completely separated, and also serving as a guide for the movement of the assembly.

Inside the external parallel lower telescopic pipes of the main structure two symmetric and parallel springs are located, and their purpose is to raise the upper cylindrical body when a cable compressing two cylinders ceases to exert a force.

These cylinders are joined by two steel cables traversing the interior of the above-described vertical external pipes, in such a way that the cable is anchored or fixed to this structure in a lower cylinder, and the cable reaches an upper cylinder where a set of pulleys force the cable downwards to another pulley anchored on the lower cylinder, which in turn pulls the cable upwards again to the other end of the cable, until it is fixed to a set of symmetric pulleys in the upper cylinder lid and both are connected by a horizontal axle, activated by means of a dented wheel connected to a geared motor. Thus, both sets of pulleys distribute the required force to compress the assembly of the container's two cylinders by means of the cable action.

On the other hand, a lid with a silicon expandable seal is located in the upper part of the chassis, to close it hermetically. Inside this lid are lodged the mechanisms and components activating the compacting action of the container assembly, the lid closure and opening automatic device, the air extraction and residue disinfection system, and a wire or mesh coil to impart reliability to the bag when packing or closing it.

A container, lodged inside the chassis, comprises at least two cylindrical bodies; a bag is inside the upper cylindrical body and in its inner cylindrical body the residues are compacted, and then compressed and sterilized.

This disclosure discloses that inside the lid there is a gear motor functioning as an air compressor, since one axle is coupled to a compressor; the opposite axle is connected to a dented wheel. This dented wheel activated by the gear motor moves longitudinally along its axle, activated by a spring or piston-driven electrovalve that, when activated, slides the dented wheel sideways. When the gear motor dented wheel is displaced sideways as mentioned above, the dented wheel coupled to the axle is engaged, rotating the pulleys which compress the container, and also allows the lid to open or close when activating the dented wheels in the ends of said axle. It should be specified that if the gear motor dented wheel is not engaged with the dented wheel in the pulleys axle, only the air compressor is activated.

Parallel to the gear motor axle and to the axle which rotates the pulleys there is another axle activated by another dented wheel which functions similarly to the previously described axle, and where there is another spring and another piston-driven electrovalve that when activated displaces the dented wheel sideways and can engage or not the gear motor axle. This gear system also functions with the three dented wheels.

This gear system also lodges other electrovalves which change the air intake or output duct to the ozone lamp. This allows the user to choose whether to sterilize the residues inside the container, the room where the container is located, or both.

Inside the lid there is also an ultrasound proximity sensor which, by means of the mechanism of dented wheels coupled to the ends of the pulleys axle can automatically open or close the lid, when the lid is moved by the rotation of the dented wheels along two dented rails located inside the laterals that fix the container body handle. The lid opens or closes when the gear motor rotates in one direction or other and directly activates the dented wheels, or when two coil springs coupled with the ends of container handlebar which is part of the upper lateral structure. When the lid is closed, a tension is exerted on the lid when the spring is deployed, and when releasing the gear motor, the dented wheel will automatically wind the spring, allowing the lid to be opened. Similarly, to close the lid, the gear motor is activated, in turn activating the dented wheels until the lid is closed and the coil spring is again tensed.

Two ozone sensors are disposed in the sealed container, indicating the ozone concentration both inside and outside the container.

In the container main structure chassis there are several extensible cubes or cylindrical bodies, designed to allow the disposal of residues or objects inside a bag in the container, and then compressing and sterilizing the residues. The cylindrical bodies is a system allowing these bodies to be extended or deployed to their use position, and thus maximizing the capacity or volume. After the lid action, the cylindrical bodies are compacted when releasing the mechanism that keeps the springs deployed, and the bodies retract until having the same volume as the residues container in its compacting position, i.e., until the upper cylindrical body is inside the lower cylindrical body.

To store the residues, the sealed container uses bags with such characteristics that they are not destroyed by ozone, and thus the residues remain packed when compressed. This is accomplished by the fact that the bottom of these bags is sealed or closed, creating a double bottom with an extra surface which can be pierced, and ring-shaped metal piece can be placed in the piercing. In the perimeter of the bag upper part there are several holes, and in a similar fashion to the inside of the bag, ring-shaped pieces can be placed, and this set of holes allow to pass a string from a coil located in the sealed container lid. Thus, when rotating the coil the string surrounding the bag is tightened, and so the bag is packaged.

To complement this description, and to better understand the characteristics of this invention, a set of drawings are provided as an integral part of this disclosure, these drawings being illustrative and not limitative, and depict the following:

As may be seen in the Figures, in an embodiment of the invention the container body has a lid (1) containing the components to be sterilized and compacted, and for opening and closing the lid; a sealed container constituted by an upper cylindrical body (2) and a upper cylindrical body (3); a sealing expandable silicon resin (4); a chassis (5) that keeps together the body and its components; two upper lateral structures (6) having in their interior a stretch of dented rail, where the dented wheel runs to open and close the lid (1) and also lodging the assembly handle. In the Figures also may be seen two lower lateral structures (6'), each of them having pulleys placed in two cylinders (7) where a cable will be sliding; a telescopic pipe (8) as a guide for the sliding of the upper cylindrical body (2) over the lower cylindrical body (3) and a spring (9) which raises the upper cylindrical body (2) to its home position when the cable ceases to exert tension on the two cylinders; and a wheel (10) for moving the assembly as a whole.

On the other hand, in the Figures also may be seen that when the upper cylindrical body (2) is displaced inside the lower cylindrical body (3), the refuse or residues contained inside the sealed container are compressed.

The components lodged inside the lid (1) are an ozone generating lamp (11); a current transformer (12) energizing the ozone lamp; an ultrasound movement sensor (13); a rechargeable battery (14) to energize all the system mechanisms and components; an activated carbon filter (15) or HEPA (High Efficiency Particulate Air) filter; air input and output pipes (16) derived from the air compressor (21); a pulley axle (17) having in both ends pulleys (71) coupled with the gear motor axle (20); dented wheels (24*a*, 24*b*, 24*c*) which activate the moving parts of the assembly; and a string coil (19) for closing bags.

The lid (1) comprises a motor piston-driven electrovalve (23*a*) to activate the gears of the gear motor (20) and a coil piston-driven electrovalve (23*b*) to activate the gears of the string coil (19). Also, a motor dented wheel (24*b*) of the gear motor axle (20) and a coil dented wheel (24*c*), tensioned by a motor spring (18*b*) and a coil spring (18*a*) respectively. As may be seen in the Figures, several movement configurations may be set inside the lid (1), based on the location of the dented wheels (24*a*, 24*b*, and 24*c*). Thus, among these setups, the dented wheels can rotate the pulleys axle (17) which compresses the sealed container (not shown); or the wheels may be lodged in the ends of their axles for opening and closing the lid (1); or may rotate the coil dented wheel (24*c*) which activates the string coil (19); or, depending on the location of the pulleys axle (17) and the gear motor axle (20), the wheels may all move jointly. Also, the dented wheels may not engage the motor dented wheel (24*b*), and thus only the air compressor (21) will function.

Accordingly, in an embodiment of the lid (1) activation by the gear motor (20), the closure and opening of the lid (1) may function when the pulleys axle dented wheel (24*a*) and the motor dented wheel (24*b*) raise or lower a displacement dented wheel (24*d*) by means of dented rails (22). Moreover, the cylinders (7), which wind or unwind steel cables (25), are located in the same axle where the pulley dented wheel (24*a*) and the displacement dented wheels (24*d*) are inserted. It can be seen in the Figures that, when the motor electrovalve (23*a*) and the coil electrovalve (23*b*) are located in this position, the entrance of air or ozone to the residues lodged inside the sealed container can be opened or closed.

Another detail that can be seen in the figures is the location of the components of the lid (1) when the pulleys axle dented wheel (24*a*) and the motor dented wheel (24*b*) are in their home position. In this case, the cables (25) exert pressure on the sealing expandable silicon resin (4) and lower the lid (1) in relation to the chassis (5) supporting the sealed container. When the lid (1) is in an inert state, the displacement dented wheels (24*d*) cannot engage the dented rails (22), even if the pulleys and the pulleys axle (17) are rotating and compressing the upper cylindrical body (2), and the pulleys axle dented wheels (24*a*) and the motor dented wheels (24*b*) are rotating freely. On the other hand, the location of the lid (1) components when the cable (25) ceases to exert pressure and is not compressing the pulleys (71), the dented wheels will rotate in the opposite direction, thus raising the lid (1) due to the expansion of the silicon seal (4). Thus, the motor axle dented wheels (24*a*) and the motor dented wheels (24*b*) engage the dented rails (22).

The opening and closure of the lid (1) is by means of handle in the upper lateral structure (6) of the container, where a coil spring (40) tensions the lid (1) when the gear motor (20) ceases to exert tension on the pulleys axle dented wheels (24*a*); both are located inside the lid, and hence the lid (1) is raised by the action of the coil spring (40). Inversely, to close the lid (1) again, the gear motor (20) activates the motor dented wheel (24*b*) and the lid (1) follows the same path, although now in an opposite direction.

As may also be seen in the figures, the container body has a mechanism comprised by a set of cylinders (7) located in the lower lateral structure (6') and pulleys (71) in the lid (1), connected by steel cables (25) which compress the sealed container. The steel cable (25) path from the bottom is described as follows: the first end of the steel cable (25) is fixed on a lower location of the chassis (5) of the lower cylinder, and from this point it reaches the upper cylinder (7) anchored in an upper point of the chassis (5) of the upper cylinder, surrounds the perimeter of this upper cylinder (7) and descends to another lower cylinder (7) which in turn is also anchored in a lower point of the chassis (5), the steel cable (25) surrounds the perimeter of this last lower cylinder (7) and the reaches the pulley (71) located inside the lid (1). Hence, the lid (1) is activated by the pulleys axle (17) which in turn is activated by the pulleys axle dented wheel (24*a*) coupled to the motor dented wheel (24*b*) of the gear motor (20).

Another detail of the present invention is that this container body mechanism can be comprised by a plurality of cylinders (7) or tacks, also located in the lower lateral structure (6') and pulleys (71) of the lid, where the force is distributed along the cable (25) to compress the sealed container. In an embodiment of the invention, the sealed container is formed by interchangeable bodies where the objects or residues to be sterilized and/or compressed are located. As is depicted in the figures, the sealed container can be comprised by an upper hollow cylinder (28) with handles (30) and dilation grooves (29) which slides inside an intermediate hollow cylinder (27), which in turn slides inside a lower hollow cylinder (32) closed at its base. Between the intermediate hollow cylinder (27) and the lower hollow cylinder (32) is a bag (31), such as a paper bag, and its lateral and lower perimeter is surrounded by the string (26).

Also, the upper hollow cylinder (28) can have a tab folded inwards (28*a*) surrounding its diameter and the lower hollow cylinder has an outward folded tab (27*a*), with a lace (27*b*) located slightly under this last tab. The purpose of this system is to keep the two cylinders vertically deployed during the filling period, preventing them to slide or flex, since the inward folded tabs (28*a*) prevent the cylinders to be spaced apart. Inversely, the lace (27*b*) allows the two cylinders to flex if there is no force exerted to dilate the outward folded tabs (28*a*), by means of dilation grooves (29). In the figures the sealed container is depicted with the upper hollow cylinder (28) and lower hollow cylinder before and after the compacting, allowing the bag (31) to be packed and closed once its content is compressed. Once removed from the sealed container the upper hollow cylinder (28) and the intermediate hollow cylinder (27), only the lower hollow cylinder with a base (32) is left with the disinfected and compressed residues, and the bag (31) is automatically knotted when pulling the string (26) from the string coil (19). Lastly, the figures depict the bag (31) with holes (33*b*) having metal or plastic washers (33*a*) set thereon, serving as a guide for the string (26). With this feature, the bag (31) can pack the compressed residues when the string coil (19) winds the string (26) by means of the gear motor (20), previously described, and located in the lid (1).

The invention claimed is:

1. A residues-compacting container with a disinfection system, comprising:
- a structure forming a container main framework, which is vertically displaceable, comprising:
  - a chassis internally supporting a sealed container and having a plurality of wheels mounted to its base;
  - two lower lateral structures, each of the lower lateral structures longitudinally fixed on each side of the chassis; each of the lower lateral structures comprising:
    - a cylinder fixed in each of a lower point and an upper point of the chassis,
    - a steel cable contacting both of the cylinders,
    - a spring located over a lower cylinder of the plurality of cylinders and
    - a telescopic pipe located over the spring;
  - two upper lateral structures with their lower ends joined to each of the lower lateral structures; and
  - a sealed container, lodged in the chassis, comprising:
    - a lower cylindrical body and
    - an upper cylindrical body;
- a lid located over the chassis, the lid moves along the two upper lateral structures by means of a displacement dented wheel and pulleys, wherein the lid has a hermetic sealing resin, the lid comprising:
  - an ozone generating lamp, connected to an air compressor with air inlet and outlet pipes,
  - an ultrasound movement sensor,
  - a carbon filter and
  - a gear motor for activating the lid movement, contacting through a motor spring and a motor dented wheel, the motor dented wheel operatively connected to a pulley axle dented wheel located on a pulley axle; and wherein the ozone generating lamp is connected with a current transformer, a battery and an air compressor; and
- a bag located inside the sealed container, wherein residues are disinfected and compacted when the upper cylindrical body travels longitudinally downwards to a position of the lower cylindrical body when compressed by the lid.

2. The residues-compacting container with the disinfection system according to claim 1, wherein the lid further comprises a string coil connected with a coil spring which in turn is connected to a coil dented wheel supported by a coil piston-driven electrovalve, wherein the coil dented wheel is connected with the motor dented wheel.

3. The residues-compacting container with the disinfection system according to claim 2, wherein a movement of the motor dented wheel, the coil dented wheel and the pulley axle dented wheel rotates the pulley axle.

4. The residues-compacting container with the disinfection system according to claim 2, wherein the pulley axle dented wheel and the motor dented wheel raise and lower the displacement dented wheel along dented rails of the two upper lateral structures; and the pulley dented wheel and the displacement dented wheels are inserted in the same axle, in which the cylinders are located which wind and unwind the steel cables, such that a motor electrovalve of the motor dented wheel and the coil piston-driven electrovalve open and close an entrance of air to an inside of the sealed container, activating opening and closure of the lid by means of the gear motor.

5. The residues-compacting container with the disinfection system according to claim 4, wherein the upper lateral structure has a coil spring connected with the displacement dented wheel of the lid which activates the opening and closure of the lid.

6. The residues-compacting container with the disinfection system according to claim 2, wherein the sealed container includes an upper hollow cylinder with handles and dilation grooves, which slides inside an intermediate hollow cylinder which in turn slides inside a lower hollow cylinder (32) having a closed base; and between the intermediate hollow cylinder and the lower hollow cylinder the bag is located, whose lateral and lower perimeter is surrounded by a string.

7. The residues-compacting container with the disinfection system according to claim 1, wherein the sealed container includes an upper hollow cylinder with dilation grooves along its body, and an inwardly folded tab surrounding all its diameter; and a lower hollow cylinder with an outwardly folded tab surrounding all its diameter and a lace located below.

8. The residues-compacting container with the disinfection system according to claim 6, wherein the bag has holes with washers for passing the string compacting the bag when activating the string coil of the lid.

* * * * *